3,344,102
AQUEOUS ZINC CHLORIDE SOLUTIONS OF
VINYLENE GLYCOL POLYMERS
William A. H. Huffman, deceased, late of Durham, N.C., by Ernestine H. Huffman, executrix, Nashville, Tenn., and John B. Clements, Chapel Hill, N.C., assignors to Monsanto Company, St. Louis, Mo., a corporation of Delaware
No Drawing. Filed Dec. 1, 1965, Ser. No. 510,988
3 Claims. (Cl. 260—29.6)

ABSTRACT OF THE DISCLOSURE

Difficultly soluble homopolymers and interpolymers having recurring

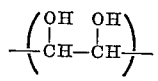

groups have been found to be readily soluble in aqueous zinc chloride.

---

This invention relates to novel polymer solutions.

Polymers of vinyleneglycol which contain recurring $\text{+CHOH—CHOH+}$ linkages are known in the art. They have been reported by Newman and Addor in J.A.C.S. 75, 1263 (1953) and 77, 3789–3793 (1955); by Marder and Schuerch, J. Polymer Science 44, 129–142 (1960) and by Field and Schaefgen in J. Polymer Science 58, 533–43 (1962). These polymers have been described as having "extraordinary solubility properties" because attempts to dissolve, and even swell them in a wide range of materials has been reported to be unsuccessful. For example, Marder et al., above cited, indicated that such polymers were not soluble in distilled water, cold concentrated urea, cupriethylene diamine, 72 percent sulfuric acid, alkalis at a variety of temperatures and concentrations, hot and cold dimethylformamide, hot and cold glycerol, ethylene glycol, dimethylsulfoxide, methanol, acetone and other solvents. The authors were, however, successful in determining that the polymers were soluble in molten urea.

Among the objects of this invention is the provision of a novel method for dissolving polymers of vinylene glycol.

A further object of the invention is to provide novel solutions of polymers heretofore known to have extraordinary solubility properties.

These and other objects of this invention may be accomplished through the discovery that polymers of vinylene glycol are readily soluble in aqueous solutions of zinc chloride.

The polymers of vinylene glycol soluble in aqueous zinc chloride may be selected from among the essentially linear homopolymers and copolymers containing other monomers, such as vinyl acetate, vinyl chloride, vinyl fluoride, acrylonitrile, acrylamide, methyl vinyl sulfone, vinyl pyrrolidone and the like. Moreover, the polymers described herein may be blended with other polymers soluble in aqueous zinc chloride. Although the degree of polymerization has not been found to be a critical aspect of the invention, the invention is particularly applicable to the dissolution of polymers having high molecular weights.

Thus, polymers having as high as about 50,000 units in the essentially linear molecule $\text{+CHOH—CHOH+}$ may be dissolved according to this invention.

Solutions of zinc chloride employed to dissolve the polymers as described herein are preferably saturated solutions at room temperatures. However, solutions having lower concentrations of zinc chloride may be employed so long as the dissolving power is not undesirably impaired. Generally speaking the solutions should contain at least about 75 percent of the weight of zinc chloride necessary to form saturated solutions.

While the polymers may be dissolved at room temperature, dissolution is accelerated by heating, up to about the boiling point of the solution, if desired.

In addition to those solvents found by Marder et al., above cited, to be inoperative for the purpose of this invention, no dissolution of polymers of vinylene glycol was observed when tested with the following compounds:

water (superheated at 140° C.)
ethylene carbonate
resorcinol
1,3-propanediol
ethylene chlorohydrin
ethylene bromohydrin
aqueous calcium chloride
methanol saturated with $ZnCl_2$
dimethylsulfoxide with $ZnCl_2$
dimethylacetamide with $ZnCl_2$
dimethylacetamide with LiCl
tetramethyl urea
N,N'-dimethyl urea
chloral hydrate
molten antimony chloride
saturated aqeuous solution of boric acid The following examples are illustrative of the invention only and it is not intended that the invention be limited thereby.

Example I

To 460 g. of 20 percent aqueous sodium hydroxide stirred in a Waring blendor was added in portions 40.0 g. (0.465 mole) of poly(vinylene carbonate) having an inherent viscosity of 1.35. After blending for about 30 minutes, the hot contents of the blendor cup were transferred to a one liter, three-neck, round bottom flask and heated at 85–90° C. for four hours. The hot clear solution was then slowly added to 1200 ml. of water stirred by a Brookfield counter-rotating stirrer to precipitate the polymer. The product was separated from supernatant liquid and then the precipitate was dialyzed against running water for about 48 hours using a regenerated cellulose dialysis tube. Excess water was removed by centrifuging and the product was freeze dried at room temperature at 0.1 mm. The poly(vinylene glycol) product obtained by saponification of poly(vinylene carbonate) was fine, free-flowing powder.

Example II

A 0.50 g. portion of poly(vinylene) glycol was added to 6.50 g. of a saturated aqueous solution of zinc chloride and the mixture was heated to near boiling to result in a clear solution wherein the polymer was wholly dissolved. A stable solution of increased viscosity resulted upon cooling to room temperature. Such solutions are useful for fiber and film formation.

We claim:
1. Essentially linear, water insoluble polymers of vinylene glycol which contain recurring (CHOH—CHOH) linkages dissolved in an aqueous solution of zinc chloride.
2. The method of dissolving essentially linear, water insoluble polymers of vinylene glycol which contain recurring (CHOH—CHOH) linkages which omprises contacting said polymers with an aqueous solution of zinc chloride.
3. Essentially linear, water insoluble homopolymers of vinylene glycol dissolved in an aqueous solution of zinc chloride.

References Cited
UNITED STATES PATENTS

| | | | |
|---|---|---|---|
| 2,356,767 | 8/1944 | Kropa | 260—29.6 |
| 2,847,398 | 8/1958 | Gluesenkamp et al. | 260—77.5 |
| 2,847,402 | 8/1958 | Gluesenkamp et al. | 260—77.5 |
| 3,037,965 | 6/1962 | Haas | 260—77.5 |

OTHER REFERENCES

Marder and Schuerch: Journal of Polymer Science, vol. 44 (1960), pp. 129–133.

MURRAY TILLMAN, *Primary Examiner.*

W. J. BRIGGS, SR., *Assistant Examiner.*